(12) United States Patent
Granestrand et al.

(10) Patent No.: US 8,041,164 B2
(45) Date of Patent: Oct. 18, 2011

(54) TRANSITION DEVICE FOR OPTICAL WAVEGUIDES

(75) Inventors: Per Granestrand, Tyreso (SE);
Jan-Olof Wesstrom, Stockholm (SE);
Dave Adams, Stockholm (SE)

(73) Assignee: Syntune AB, Kista (SE)

( * ) Notice: Subject to any disclaimer, the term of this patent is extended or adjusted under 35 U.S.C. 154(b) by 0 days.

(21) Appl. No.: 12/666,732

(22) PCT Filed: Jun. 4, 2008

(86) PCT No.: PCT/SE2008/050658
§ 371 (c)(1),
(2), (4) Date: Dec. 24, 2009

(87) PCT Pub. No.: WO2009/002253
PCT Pub. Date: Dec. 31, 2008

(65) Prior Publication Data
US 2010/0322560 A1    Dec. 23, 2010

(30) Foreign Application Priority Data
Jun. 27, 2007 (SE) ..................................... 07015563

(51) Int. Cl.
*G02B 6/26* (2006.01)
(52) U.S. Cl. ............................... 385/43; 385/12; 29/600
(58) Field of Classification Search .................. 385/12, 385/14, 43; 29/600
See application file for complete search history.

(56) References Cited

U.S. PATENT DOCUMENTS

| | | | |
|---|---|---|---|
| 5,659,646 | A | 8/1997 | Vinchant et al. |
| 7,079,727 | B1 | 7/2006 | Little |
| 7,184,207 | B1 | 2/2007 | Walker et al. |
| 2006/0115200 | A1* | 6/2006 | Van Der Vliet ................. 385/12 |
| 2008/0080808 | A1* | 4/2008 | Tolshikhin et al. ............. 385/14 |

OTHER PUBLICATIONS

International Search Report, dated Nov. 6, 2008, from corresponding PCT application.
Bert Luyssaert et al., "Efficient Nonadiabatic Planar Waveguide Tapers", Journal of Lightwave Technology, Aug. 2005, pp. 2462-2468, vol. 23, No. 8, IEEE.
Victor Nguyen et al., "Silicon-based highly-efficient fiber-to-waveguide coupler for high index contrast systems", Applied Physics Letters, 2006, pp. 081112-1-081112-3, vol. 88, American Institute of Physics.

* cited by examiner

*Primary Examiner* — Ellen Kim
(74) *Attorney, Agent, or Firm* — Young & Thompson

(57) ABSTRACT

A transition part (1) between two optical waveguides (2,3) with different index contrast is characterised in that the transition part (1) includes a non-adiabatically up-tapered longitudinal section (8), and in that the transition (7) between the two waveguides (2,3) is arranged after the up-tapered longitudinal section (8) as seen along the main direction (L) of propagation of the light. A method of manufacturing the transition part is also described.

10 Claims, 5 Drawing Sheets

TRANSITION DEVICE FOR OPTICAL WAVEGUIDES

BACKGROUND OF THE INVENTION

1. Field of the Invention

The present invention relates to a transition part between two optical waveguides. More precisely, the invention relates to a transition part between two such waveguides with different index contrast.

2. Description of the Related Art

For example, optical waveguides are used within the field of optical communications. The ability of a waveguide to limit the size of the light field perpendicularly to the longitudinal direction of the waveguide depends on its index contrast. Herein, the expression index contrast refers to a measure of the difference in effective index in a lateral direction, diametrically to the main direction of propagation of the light, for the effective index profile of the waveguide when reduced to one dimension. High index contrast leads to a strong limitation of the extension of the light mode in the waveguide and vice versa.

For example, low index contrast waveguides are used in so called ridge lasers, in which these waveguides among other things lead to high reliability and simplified manufacturing. High index contrast waveguides are, for example, used in so called modulators, in which it is possible to affect the refractive index of the waveguides by applying a small voltage, and in which one may reach high efficiency regarding the change as a consequence of the high index contrast.

It is often desirable to mix high index contrast waveguides with low index contrast waveguides in the same technical application, whereby the problem arises of achieving transition parts between such waveguides, which transitions parts would lead to small losses and not to other problems such as for instance unwanted reflections. In particular, this is true for monolithic, integrated optical circuits, in which different waveguides are arranged on the same chip.

Moreover, in certain applications it may be desirable to control the losses in such transition parts with great exactness to certain predetermined values. For example, this may be the case when exact control is desired over the difference in loss between several different transitions, for instance in a modulator.

The American U.S. Pat. No. 5,799,119 discloses a transition part connecting two ridge structure waveguides, in other words waveguides involving a so called ridge structure, with low and high index contrast, respectively (see FIG. 11 in the referred to patent). The transition takes place by the use of a gradually narrowing, contracting or down-tapering of a lower layer in the waveguide, whereby the vertical mode confinement gradually changes across the transition.

SUMMARY OF THE INVENTION

The present invention solves the above described problems.

Thus, the present invention relates to a transition part between two optical waveguides with different index contrast, and is characterised in that the transition part comprises a non-adiabatically up-tapered longitudinal section, and in that the transition between the two waveguides is arranged after the up-tapered longitudinal section as seen along the main direction of propagation of the light.

Furthermore, the invention relates to a method for the manufacturing of a transition part.

BRIEF DESCRIPTION OF THE DRAWING FIGURES

In the following, the invention will be described in detail, with reference to exemplifying embodiments of transition parts in accordance with the invention.

None of the appended drawings are made to scale, they are rather intended to explain the principles of the invention. Thus, certain parts of the figures may have exaggerated dimensions for reasons of clarity. Reference numerals are the same for corresponding parts in different figures.

DETAILED DESCRIPTION OF THE INVENTION

Figure 1:
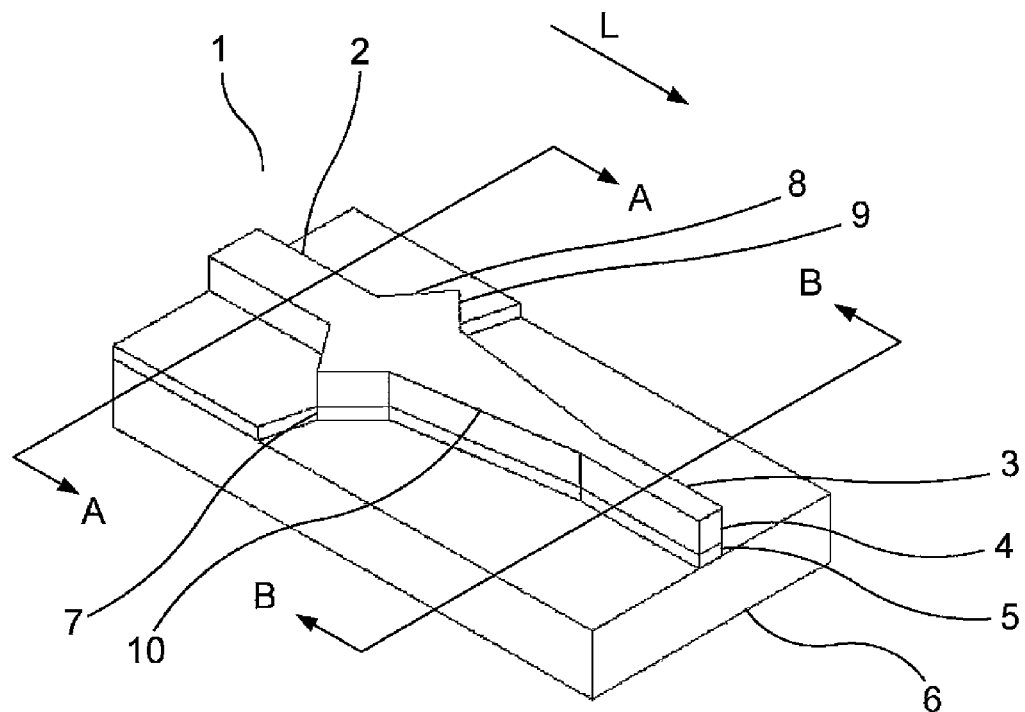
FIG. 1 is an overview perspective view of a transition part according to a first preferred embodiment of the invention.

FIG. 1 is a perspective view over a transition part 1 according to a first preferred embodiment. The transition part 1 connects a first low index contrast waveguide 2 to a second high index contrast waveguide 3.

The transition part 1 has a longitudinal direction L, coincident with the main direction of propagation of the light being conveyed through the waveguides 2, 3.

Figure 2A:
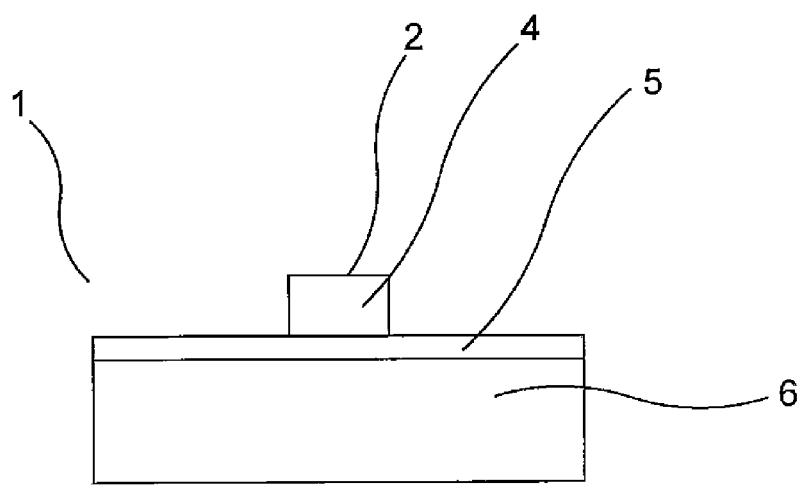
FIG. 2a is a cross longitudinal sectional view taken along the line A-A of FIG. 1, showing the structure for the low index contrast waveguide in the transition part according to FIG. 1.

FIG. 2a shows a longitudinal cross section taken along the line A-A of FIG. 1, and thus illustrates the longitudinal cross sectional form of the first waveguide 2. A low index contrast waveguide may also be denoted as "weakly waveguiding", which expression aims at the weaker uniting of the light travelling through the waveguide. Hence, the light mode has relatively large dimensions in the first waveguide 2.

Figure 2B:
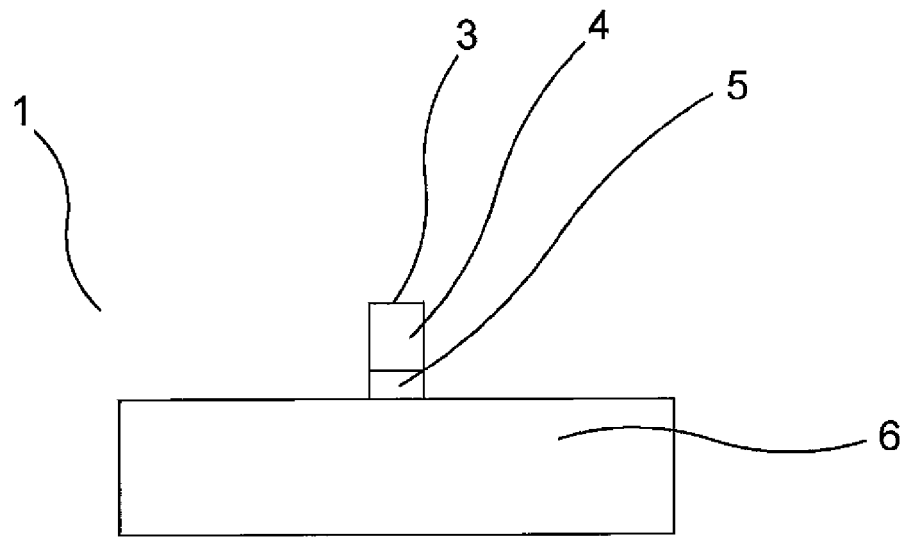
FIG. 2b is a cross longitudinal sectional view taken along the line B-B of FIG. 1, showing the structure for the high index contrast waveguide in the transition part according to FIG. 1.

Correspondingly, a high index contrast waveguide may be denoted as "strongly waveguiding". FIG. 2b shows a cross longitudinal section taken along the line B-B of FIG. 1, and therefore illustrates, in a manner corresponding to the one of FIG. 2a, the longitudinal cross sectional form of the second waveguide 3. Thus, its light intensity distribution is relatively coherent in the second waveguide 3.

Both the first 2 and the second 3 waveguides each comprise an upper ridge part 4, having relatively low optical refractive index, and a lower ridge part 5 with relatively high optical refractive index. The waveguides 2, 3 are similar, but exhibit the difference that the lower ridge part 5 of the first waveguide is substantially wider. Preferably, the lower ridge part 5 of the second waveguide 3 has essentially the same width as its upper ridge part 4.

The refractive index for the upper ridge part 4 may be any suitable value, but is preferably between 3.0 and 3.3, preferably about 3.18. The refractive index of the lower ridge part 5 may be any suitable value that is higher than the one for the upper ridge part 4, but is preferably between 3.4 and 3.6, preferably about 3.50. Both the upper 4 and the lower 5 ridge parts may be manufactured from InP or any other suitable, optically guiding material. However, it is realised that both the ridge parts 4, 5 each may comprise a plurality of different layers, with different optical properties, even if this is not shown herein for reasons of clarity. Specifically, the lower ridge part 5 may comprise a so called quantum well stack, which is a number of periods, for example between 10 and 20 periods, of wells and barriers having different band gaps.

Furthermore, FIGS. 2a and 2b show that the lower ridge part rests upon a substrate 6, which has a refractive index which is lower than the lower ridge part 5, preferably between 3.0 and 3.3. Thus, the light mode in the respective waveguide is confined by the fact that the lower ridge part 5 has a higher refractive index than both the upper ridge part 4 and the substrate 6.

The lower ridge part 5 may also comprise a protective top layer, adjoining the upper ridge part 4. For example, such a protective layer may comprise a material which is also arranged in the upper ridge part and/or the substrate 6.

The transition 7 between the first 2 and the second 3 waveguides is constituted by the edge where the lower ridge part 5 passes from being wider than the upper ridge part 4 into being essentially as thin as the upper ridge part 4 (see FIG. 1).

Figure 3:
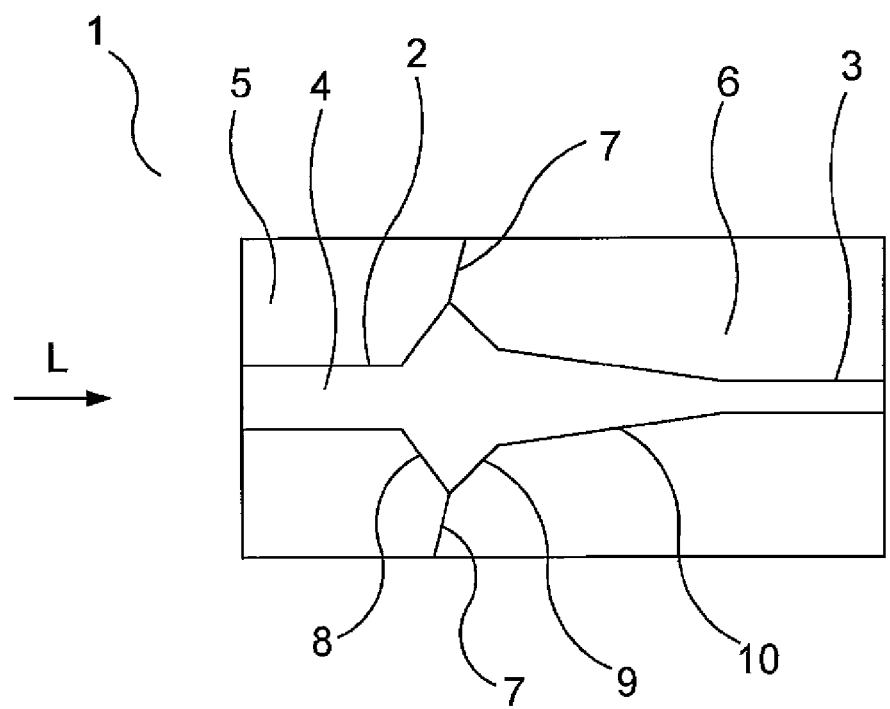
FIG. 3 is a top view of the transition part according to the first preferred embodiment according to FIG. 1.

FIG. 3 illustrates the transition part 1 according to the first preferred embodiment, as seen from above. As is clear from the figure, the transition part 1 comprises an expanding or up-tapered longitudinal section 8, in which the width of the upper ridge part 4 is continuously widened from its width in the first waveguide 2 to a width which is substantially larger. A longitudinal section 9, which contracts or tapers down in a corresponding manner, is furthermore arranged after the up-tapered longitudinal section 8 along the longitudinal direction L of the transition part. The transition 7 between the first 2 and the second 3 waveguides is arranged between the up-tapered 8 and the down-tapered 9 longitudinal sections.

The up-tapered longitudinal section 8 has a degree of expansion which is sufficiently rapid for admitting non-adiabatic conditions, meaning that the optical power distribution is not preserved across the local normal modes of the structure. Furthermore, the down-tapered longitudinal section 9 has a degree of down-tapering which is also sufficiently rapid to admit non-adiabatic conditions, in a way which corresponds to that of the up-tapered longitudinal section 8. Consequently, the intensity of the conveyed light becomes low at the edges of the up-tapered 8 and the down-tapered 9 longitudinal sections, respectively, especially in those areas in which the up-tapered longitudinal section 8 ends its expansion, and where its edges therefore change their angle. This is desirable, since such irregularities give rise to unwanted reflections.

Since the transition 7 is arranged between the up-tapered 8 and the down-tapered 9 longitudinal sections, the intensity of the conveyed light will be low even in those areas that are situated close to the transition 7. Apart from lowering unwanted reflections, this is desirable since the properties of the transition 7 are difficult to control during manufacturing.

FIG. 3 also shows a down-tapered longitudinal section 10, arranged after the down-tapered longitudinal section 9 along the longitudinal direction L of the transition part 1. Contrarily to what is the case for the longitudinal section 9, the tapering down of the longitudinal section 10 is sufficiently slow to admit essentially adiabatic conditions. Thereby, most of the conveyed light will be transformed, by an adiabatic mode transformation, to the fundamental mode of the second waveguide 3. This minimises the optical losses in the transition part 1.

Moreover, FIG. 3 illustrates that the edge of the lower ridge part 5, which marks the transition 7 between the two waveguides 2, 3, is arranged with an angle different from 90 degrees in relation to the longitudinal direction L of the transition part 1, which leads to less unwanted reflections in the transition part 1.

In the following FIGS. 4-7, the perspective shown corresponds to that shown in FIG. 3.

Figure 4:
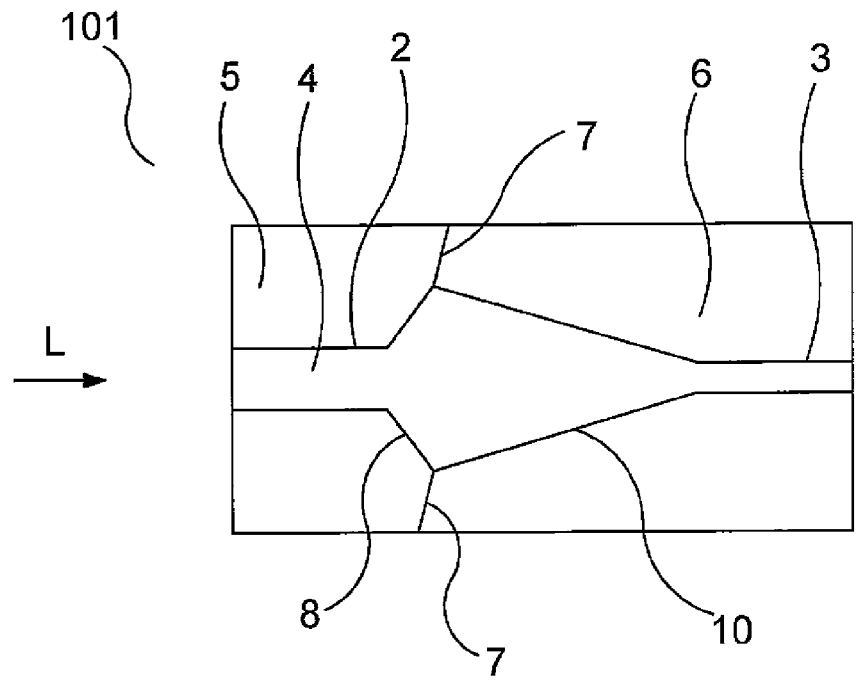
FIG. 4 is a top view of the transition part according to a second preferred embodiment.

FIG. 4 illustrates a second preferred transition part 101 according to the present invention. The down-tapered longitudinal section 9 is missing, as compared to the transition part 1 illustrated in FIG. 3. This means that the light incident into the transition part 101 in its longitudinal direction L is firstly conveyed through the non-adiabatically up-tapered longitudinal section 8, at the end of which the transition 7 between the two waveguides 2, 3 is arranged, resulting in the geometric details in connection with the transition 7 being kept at a distance from the areas of the light field that are intensive. Thereafter, the light immediately incides into the adiabatically down-tapered longitudinal section 10, and is thus mode transformed into the mode of the second waveguide 3.

Depending on the purpose of the application, the longitudinal section 10 may also have partly non-adiabatic properties. This may be especially useful in case it is desired to control the losses through the transition part 101 to be a certain predetermined value.

Figure 5:
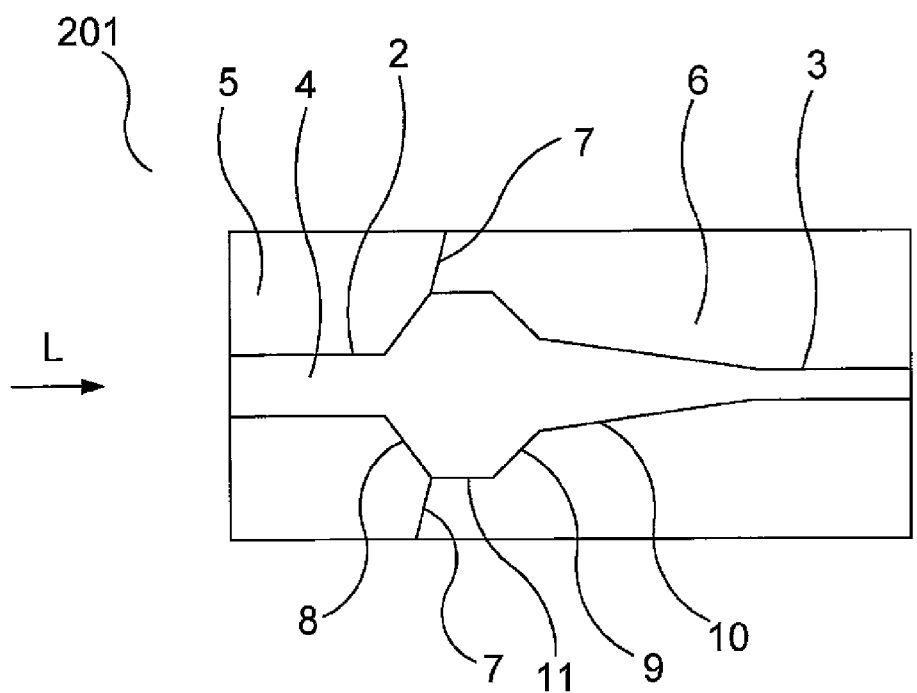
FIG. 5 is a top view of the transition part according to a third preferred embodiment.

FIG. 5 illustrates a third preferred transition part 201 according to the present invention. Between the non-adiabatic longitudinal sections 8, 9, a longitudinal section 11 having an essentially homogeneous width is arranged, the purpose of which is to convey the light between the longitudinal sections 8, 9. The transition 7 between the two waveguides 2, 3 is arranged immediately after the non-adiabatic longitudinal section 8, but it is realised that the transition 7, depending on other prerequisites associated with the current application, may also be arranged at another location along the longitudinal section 11.

It is realised that other configurations of adiabatically and non-adiabatically, respectively, up-tapered and down-tapered, respectively, longitudinal sections are also possible, without departing from the basic idea of the invention. For example, a transition between a strong and a weak waveguide may be arranged by initially arranging an adiabatically up-tapered longitudinal section, the purpose of which is to mode transform incident light from the mode of the strong waveguide to the mode of the weak waveguide, and thereafter to arrange a non-adiabatically up-tapered longitudinal section followed by a non-adiabatically down-tapered longitudinal section, the combined purpose of which is to keep the areas of a transition between the waveguides that are geometrically difficult to control, arranged between the non-adiabatic longitudinal sections, away from the intensive parts of the light field.

The above described embodiments are advantageously used if the purpose of the current embodiment is to minimise the optical losses in a transition part. However, if the purpose is to control these losses exactly, one advantageously starts off from such a transition part that will minimise losses, and then applies modifications that in a controlled manner increase these losses.

Figure 6:
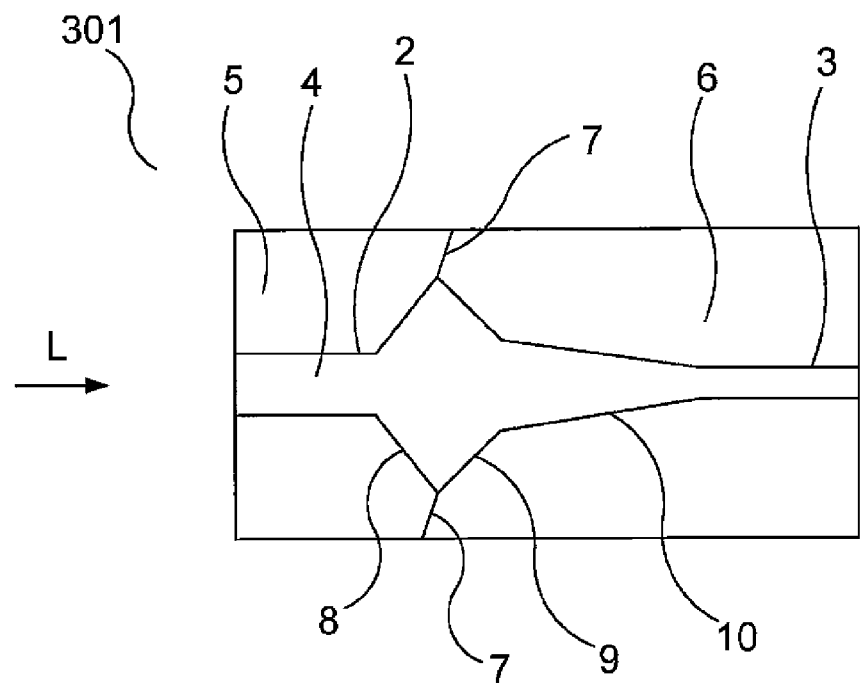
FIG. 6 is a top view of the transition part according to a fourth preferred embodiment.

To this end, FIG. 6 illustrates a fourth preferred transition part 301 according to the present invention, the purpose of which is to achieve a certain predetermined optical loss. In comparison to the transition part 1, the geometrical dimensions of the transition part 301 in the plane shown in FIG. 6 have been enlarged with respect to the non-adiabatic longitudinal sections 8, 9, leading to increased losses in these two longitudinal sections 8, 9. The size of the additional losses resulting from such an increase in dimensions changes continuously with the dimension increase, and may be calculated numerically or be tested empirically in a known way.

Figure 7:
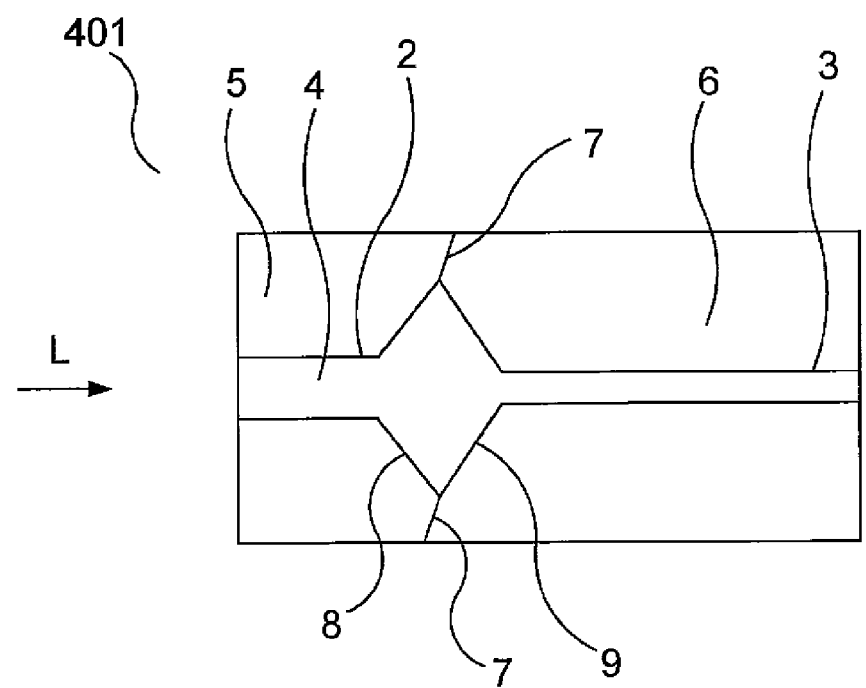
FIG. 7 is a top view of the transition part according to a fifth preferred embodiment.

FIG. 7 illustrates a complementary way of increasing losses through a transition part, in the form of a fifth preferred transition part 401 according to the present invention. In comparison with the transition part 301 according to FIG. 6, the adiabatically down-tapered longitudinal section 10 has additionally been removed from the transition part 401. This arrangement leads to that the losses increase even more as compared to the embodiment shown in FIG. 6. Again, it is possible to numerically calculate or empirically test the increase of the losses beforehand.

Figure 8:
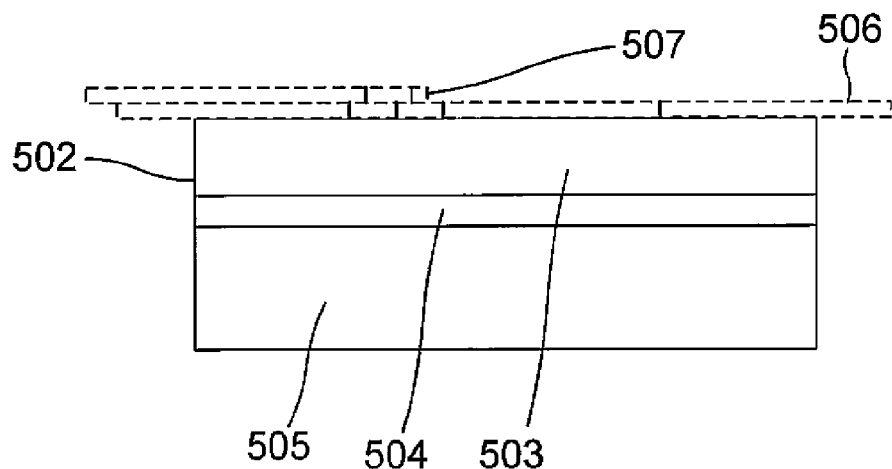
FIG. 8 is a side view showing a preferred method for manufacturing a transition part according to the present invention.
Figure 9:
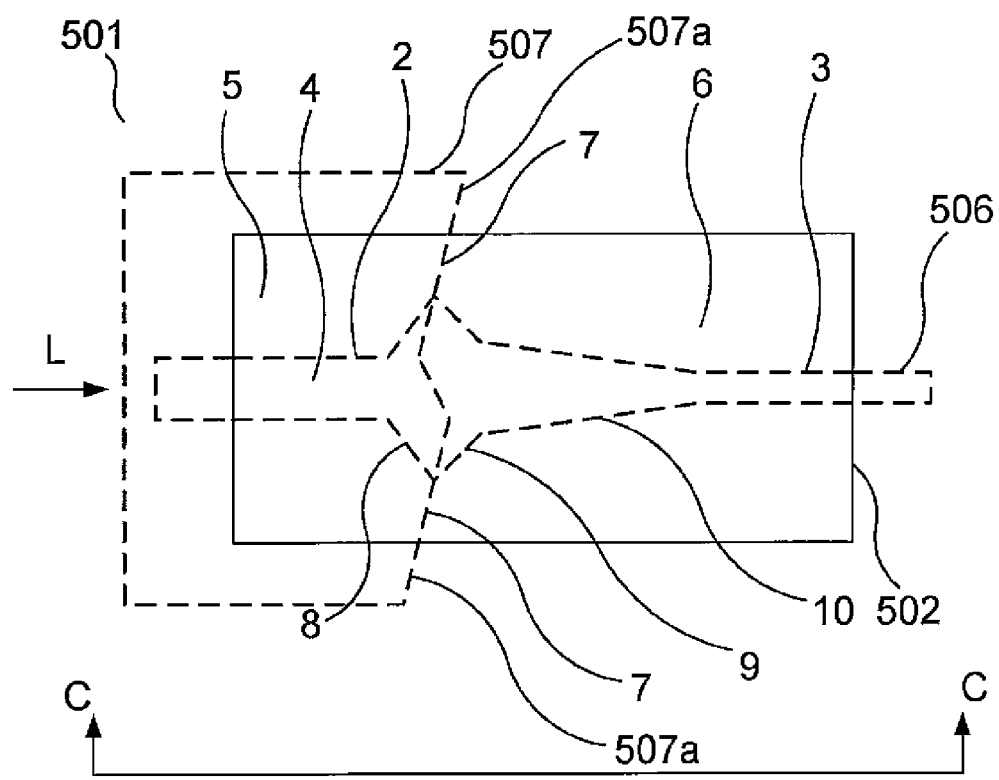
FIG. 9 is a top view showing a preferred method for manufacturing the transition part of FIG. 8.

FIGS. 8 and 9 illustrate, in side and top views, respectively, a preferred way of manufacturing a transition part 501 according to the present invention from a wafer 502 made from a suitable, light guiding material. FIG. 8 shows the wafer 502 from the side indicated by C-C in FIG. 9. The choice of material for the wafer depends on the purposes of the current applications, and it is made in a conventional manner. The wafer 502 comprises at least one upper layer 503 with relatively low refractive index, and one lower layer 504, with relatively high refractive index. The wafer may also comprise a substrate layer 505.

During the process, firstly the upper layer 503 is etched, using a first etching mask 506, which is arranged to correspond to the geometrical form for the upper ridge part 4. Hence, through this first etching, the upper ridge part 4 is formed both for the first 2 and the second 3 waveguide. Furthermore, the geometrical forms of the first etching mask 506 corresponds to that for the non-adiabatic longitudinal sections 8, 9, as well as to the adiabatic longitudinal section 10. Thus, the geometrical form of the upper ridge part 4, created through the process, also embodies the optical properties of the longitudinal sections 8, 9, 10.

Thereafter, parts of the lower layer 504 are also etched, using the second etching mask 507, used in combination with the first etching mask 506. The second etching mask 507 corresponds to the geometrical form of the transition 7 itself, between the two waveguides 2, 3. In other words, the material of the lower layer 504 is etched above the ridge area along the second waveguide 3 which is covered by the first etching mask 506, but not that along the first waveguide 2. Hence, the lower ridge part 5 for both waveguides 2, 3 is formed, starting out from the lower layer 504 of the wafer 502. To sum up, both the upper ridge part 4 and the lower ridge part 5 will be common to the two waveguides 2, 3. The different longitudinal sections 8, 9, 10 of the transition 501 will have their properties decided from the geometrical design of the upper, common ridge part 4, and the respective index contrast of the waveguides 2, 3 will essentially depend on the different respective width of the lower, common ridge part 5.

Moreover, in FIG. 9 it is illustrated that the edge 507a of the second etching mask 507 that corresponds to the transition 7 between the waveguides 2, 3 is placed upon the wafer 502 at an angle, in relation to the longitudinal direction L of the transition part 501, which is different from 90 degrees. In other words, the edge of the lower ridge part 5 that marks the transition 7 between the waveguides 2, 3 will not be perpendicular to the longitudinal direction L.

Furthermore, the edge 507a comprises a zigzag pattern, essentially extending in a direction essentially perpendicular to the longitudinal direction L of the transition part 501.

This design of the second etching mask 507 allows for a fault tolerant structure of the hence manufactured transition 501. By way of example, the inventors have found that if the respective width of the waveguides 2, 3 is in the magnitude of 2.8 µm and 2.0 µm, respectively, an error in the positioning of the second etching mask 507 of ±1 µm will not give rise to more than a negligible structural difference in the area of the transition part 501 in which the intensity of the light field is noticeable. Also, the angle of the transition 7 will not be affected by any position errors of the second etching mask 507, which results in that the risk for increased reflections is minimised when such errors arise during the manufacturing of the transition part 501.

After the two etching steps, the etching masks 506, 507 are removed, and any additional layers may be added to the structure.

Above, preferred embodiments have been described. However, it will be apparent to the skilled person that many modifications may be made to the described embodiments without departing from the spirit of the invention. Thus, the invention shall not be limited to the above described embodiments, but rather be variable within the scope of the enclosed claims.

The invention claimed is:

1. A transition part (1,101,201,301,401) between two optical waveguides (2,3) with different index contrast, the transition part (1,101,201,301,401) comprising:
   a non-adiabatically and continuously up-tapered longitudinal section (8);
   an adiabatically down-tapered longitudinal section (10), arranged after the non-adiabatically up-tapered longitudinal section (8) as seen in a main propagation direction (L) of light, between said longitudinal sections a transition (7) between the two waveguides (2,3) is arranged along the main propagation direction (L) of the light; and
   a non-adiabatically down-tapered longitudinal section (9), arranged immediately after the non-adiabatically up-tapered longitudinal section (8) as seen in the main propagation direction (L) of the light, and the transition (7) between the two waveguides (2,3) is arranged between the non-adiabatically up-tapered longitudinal section (8) and the non-adiabatically down-tapered longitudinal section (9).

2. The transition part (1,201,301,401) according to claim 1, wherein the transition (7) between the two waveguides (2,3) is arranged on a border between the non-adiabatically up-tapered longitudinal section (8) and the non-adiabatically down-tapered longitudinal section (9).

3. The transition part (201) according to claim 1, wherein a longitudinal section (11) with essentially constant width is arranged immediately after the non-adiabatically up-tapered longitudinal section (8) as seen in the main propagation direction (L) of the light, and the transition (7) between the two waveguides (2,3) is arranged along the longitudinal section (11) with essentially constant width.

4. A transition part (1,101,201,301,401) between two optical waveguides (2,3) with different index contrast, the transition part (1,101,201,301,401) comprising:
   a non-adiabatically and continuously up-tapered longitudinal section (8);

an adiabatically down-tapered longitudinal section (10), arranged after the non-adiabatically up-tapered longitudinal section (8) as seen in a main propagation direction (L) of light, between said longitudinal sections a transition (7) between the two waveguides (2,3) is arranged along the main propagation direction (L) of the light, wherein both the waveguide (2) with lower index contrast and the waveguide (3) with higher index contrast comprise a ridge structure, in both cases comprising a lower ridge part (5) with relatively high refractive index and an upper ridge part (4) with relatively low refractive index, and the lower ridge part (5) is comparatively wider in the waveguide (2) with lower index contrast.

5. The transition part (1,101,201,301,401) according to claim 4, wherein the refractive index of the lower ridge part (5) is between 3.4 and 3.6.

6. The transition part (1,101,201,301,401) according to claim 4, wherein the refractive index for the upper ridge part (4) is between 3.0 and 3.3.

7. A method for manufacturing a transition part (501) between two optical waveguides (2,3) with different index contrasts, the transition part comprising:

a transition (7) between the waveguides (2, 3), where both the waveguide (2) with lower index contrast and the waveguide (3) with higher index contrast comprise a ridge structure, in both cases comprising a lower (5) ridge part having relatively high refractory index and an upper ridge part (4) having relatively low refractory index, where both the upper (4) and lower (5) ridge parts, respectively, are common for both the waveguides (2,3), the method comprising:

manufacturing the transition part (501) from a wafer (502) with at least one upper layer (503) having comparatively lower refractory index and one lower layer (504) having comparatively higher refractory index, where the lower ridge part (5) is made wider than the upper ridge part (4) in the waveguide (2) with lower index contrast, but as wide as the upper ridge part (4) in the waveguide (3) with higher index contrast, where the transition (7) between the waveguides (2,3) comprises a step in the width of the lower ridge part (5), where the width of the upper ridge part (4) is varied along a main propagation direction (L) of the light in the transition part (501), so that at least one non-adiabatically up-tapered longitudinal section (8) is formed, which longitudinal section (8) is followed by the transition (7) between the waveguides (2,3);

etching parts of the upper layer (503) initially using a first etching mask (506), which corresponds to a geometrical form of the upper ridge part (4), so that the upper ridge part (4) of both waveguides (2,3) is formed; after which etching parts of the lower layer (504), using a second etching mask (507) in combination with the first etching mask (506), where the second etching mask (507) corresponds to the geometrical form of the transition (7), so that the lower ridge part (5) is formed, where an edge (507a) of the second etching mask (507) corresponds to the transition (7) between the waveguides (2, 3) is placed upon the wafer (502) at an angle in relation to the main propagation direction (L) of the light which is caused to be different from 90 degrees, wherein the edge (507a) comprises a zigzag pattern, essentially extending in a direction perpendicular to the main propagation direction (L) of the light.

8. The transition part (1,101,201,301,401) according to claim 4, wherein the ridge parts (4,5) each comprise a plurality of different layers with different optical properties.

9. The transition part (1,101,201,301,401) according to claim 4, wherein the upper ridge part (5) is a quantum well stack having between 10 and 20 periods of wells and barriers having different band gaps.

10. The transition part (1,101,201,301,401) according to claim 4, wherein the ridge parts (4,5) are manufactured from InP.

* * * * *